(12) United States Patent
Isch et al.

(10) Patent No.: US 8,968,558 B2
(45) Date of Patent: Mar. 3, 2015

(54) BACKWASHING FLUID FILTERING SYSTEM

(71) Applicants: Michael Edward Isch, Vicksburg, MI (US); Michael Roland Clements, White Pigeon, MI (US); Craig James Annable, Kalamazoo, MI (US); Jason Robert Swinehart, Portage, MI (US); David Lee Truman, Marcellus, MI (US)

(72) Inventors: Michael Edward Isch, Vicksburg, MI (US); Michael Roland Clements, White Pigeon, MI (US); Craig James Annable, Kalamazoo, MI (US); Jason Robert Swinehart, Portage, MI (US); David Lee Truman, Marcellus, MI (US)

(73) Assignee: Eaton Corporation, Cleveland, OH (US)

( * ) Notice: Subject to any disclaimer, the term of this patent is extended or adjusted under 35 U.S.C. 154(b) by 355 days.

(21) Appl. No.: 13/684,675

(22) Filed: Nov. 26, 2012

(65) Prior Publication Data

US 2014/0144830 A1    May 29, 2014

(51) Int. Cl.
*B01D 29/66*    (2006.01)
*B01D 29/52*    (2006.01)
*B01D 29/35*    (2006.01)

(52) U.S. Cl.
CPC .............. *B01D 29/668* (2013.01); *B01D 29/35* (2013.01); *B01D 29/52* (2013.01)
USPC ........................................................ 210/107

(58) Field of Classification Search
None
See application file for complete search history.

(56) References Cited

U.S. PATENT DOCUMENTS

| 2,237,964 | A | | 4/1941 | Haught |
| 2,884,132 | A | | 4/1959 | Kangas et al. |
| 2,925,912 | A | | 2/1960 | Clark et al. |
| 2,985,306 | A | * | 5/1961 | Statzell .......................... 210/130 |
| 4,518,501 | A | | 5/1985 | Lennartz et al. |
| 4,636,311 | A | * | 1/1987 | Litzenburger ............. 210/323.2 |
| 5,667,683 | A | | 9/1997 | Benian |
| 6,890,434 | B2 | | 5/2005 | Rott et al. |
| 8,524,075 | B1 | | 9/2013 | Quintel |
| 2012/0125834 | A1 | | 5/2012 | Gessner et al. |
| 2014/0144830 | A1 | | 5/2014 | Isch et al. |

FOREIGN PATENT DOCUMENTS

| DE | 3621724 A1 | 1/1988 |
| DE | 202004005849 U1 | 6/2005 |
| DE | 102009031358 A1 | 1/2011 |

OTHER PUBLICATIONS

International Search Report for PCT /US2013/073588, Mailed Feb. 18, 2014, European Patent Office, Netherlands, South Holland, Authorized Officer Lisa Marchetto, 4 pages.
International Search Report for PCT /IB13/03147, Mailed Aug. 5, 2014, Mail Stop PCT, ISA/US, Alexandria Virginia, Authorized Officer Lee W. Young, 2 pages.

* cited by examiner

*Primary Examiner* — Terry Cecil
(74) *Attorney, Agent, or Firm* — Fay Sharpe LLP

(57) ABSTRACT

The system of the present disclosure enables a filter cartridge having an array of filter media tubes to be remotely selectively back flushed during service by sequentially flushing the tubes with the rotary valving element to permit removal of trapped filtered material in service without disrupting the filtering flow in the balance of the filter array.

9 Claims, 4 Drawing Sheets

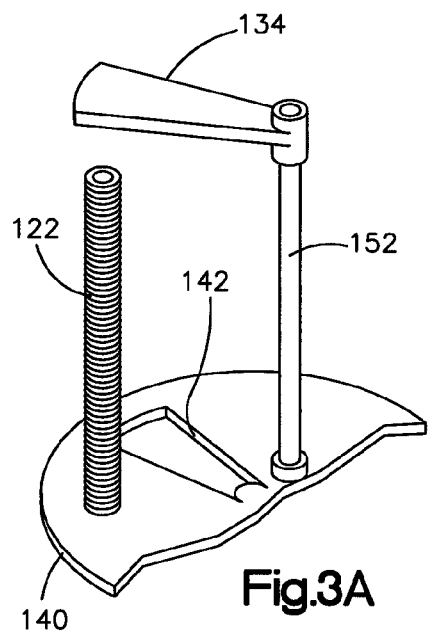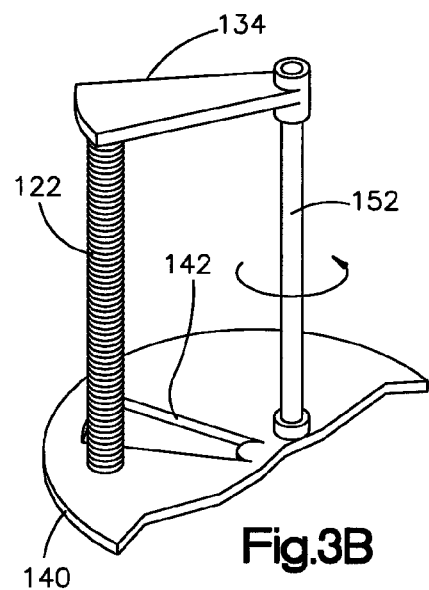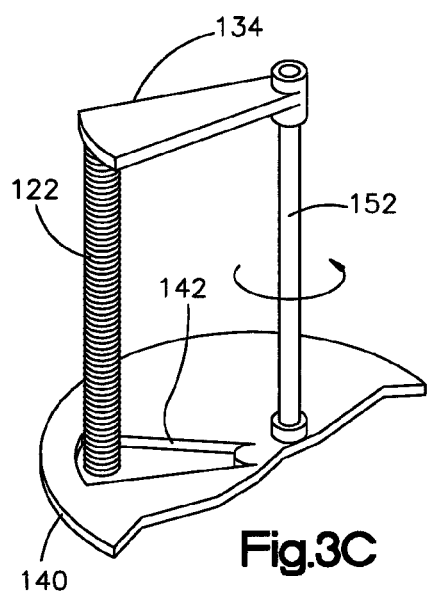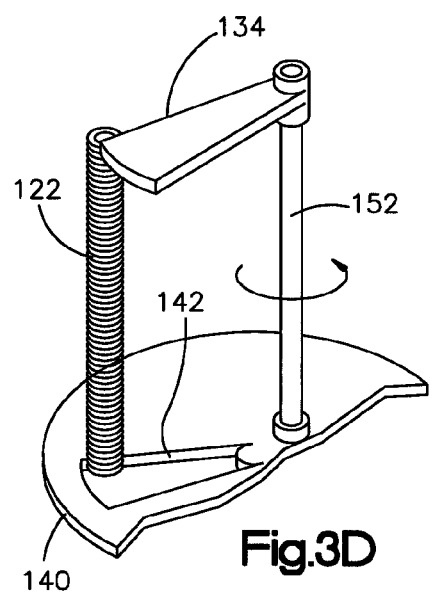

BACKWASHING FLUID FILTERING SYSTEM

BACKGROUND

The present disclosure relates to fluid filtering systems of the type connected inline for filtering pressurized fluid flowing in a processing system. Typically, filters employed for inline filtering of fluids employ a pressure vessel with a removable lid having an inlet adapted for connection to a source of pressurized fluid and an outlet adapted for connection to a fluid discharge line for continuing flow of the fluid in the fluid processing system. Filtering systems of this type also are known to employ a removable assembly of filter media elements readily removable from the pressure vessel upon opening of the lid. However, in service it is desired to minimize the need for shutting down the fluid flow system and depressurizing in order to open the pressure vessel lid and replace the fluid filter cartridge.

Filter cartridges may employ an array of tubular filtering members disposed between headers or tube sheets for positioning in the pressure vessel such that the inlet communicates with the interior of the filter tubes and the outlet is isolated from the inlet and communicates with fluid flowing exteriorly of the tubes. In service, it has been experienced that filtered foreign material, particularly particulate material, accumulates rapidly on the interior surface of the filter media tubes and results in clogging portions of the filter thereby decreasing the rate of flow through the filter which affects the fluid system operation. Thus, it has been desired to find a way or means of removing the trapped filtered material from the surface of the filter media in service without requiring shutdown of the system and replacement of the filter cartridge. It has been further desired to have the capability to automatically remove such material in a manner so as to maintain the desired rate of flow through the filtering system.

SUMMARY

The present disclosure describes a fluid filtering system with a pressure vessel of the type having a removable lid and a filter cartridge or filter media elements disposed therein having a plurality of tubular filtering elements disposed in an array between tube sheets defining an inlet and outlet chamber in the pressure vessel. The inlet chamber communicates flow from a pressure vessel inlet exclusively through the interior of the tubes and fluid discharging from the filter media tubes flows into the outlet chamber which communicates with an outlet of the pressure vessel. The filter media elements have a centrally disposed core tube isolated from the outlet chamber which encloses a shaft extending through and journalled for rotation in the tube sheets and having a paddle valve member connected thereto closely adjacent the inlet ends of the tubular filter elements and an outlet disc valve member disposed for rotation with the shaft closely adjacent the outlet end of the filter media tubes. The outlet ends of the filter media tubes communicate with a drain chamber formed inside the pressure vessel by one of the cartridge tube sheets with the drain chamber isolated from the outlet chamber and connected to an atmospheric drain provided in the pressure vessel.

In one version, the end of the shaft with the discharge disc extends outwardly through the pressure vessel drain chamber through a rotary seal and is connected to a motorized rotary drive mechanism or speed reducer for effecting selective rotation upon energization of the motor. In another version, the motor and speed reducer are mounted on the lid. A paddle valve rotating with the shaft is operative to progressively block the inlet flow to individual tubular filter elements while the discharge disc valve member permits the drain to be open to the drain circuit which may be at atmospheric pressure. This causes the pressure in the interior of the particular tube to drop to a level below that of the outlet chamber thereby causing backflow through the selected filter tube to remove trapped particulate matter from interior of the filter media tube and flush the matter to the drain. Continued rotation of the shaft causes progressively similar blocking and draining of the remaining filter media tubes in the array. The filtering system of the present disclosure thus permits selective remote control of removal of trapped filtered material from the filter media tubes in the filter cartridge without the necessity of depressurizing the system and removing the cartridge. The back flushing of the system of the present disclosure may be performed at sufficient intervals to maintain the desired flow rate in the filtering system.

BRIEF DESCRIPTION OF THE DRAWINGS

FIG. 3a is a view of the paddle valve and discharge disc valve in position with respect to one of the filter tube elements permitting normal flow therethrough;

FIG. 3b is a view similar to FIG. 3a of the paddle valve rotated to block the inlet of the filter media tube;

FIG. 3c is a view similar to FIG. 3a showing the paddle valve maintaining the inlet end of the tubular filter media blocked with the disc valve opening the discharge end to the drain chamber;

FIG. 3d is a view similar to FIG. 3a showing the paddle valve admitting inlet pressure to the filter media tube with the discharge end open by the disc valve to the drain chamber;

DETAILED DESCRIPTION

Figure 1:
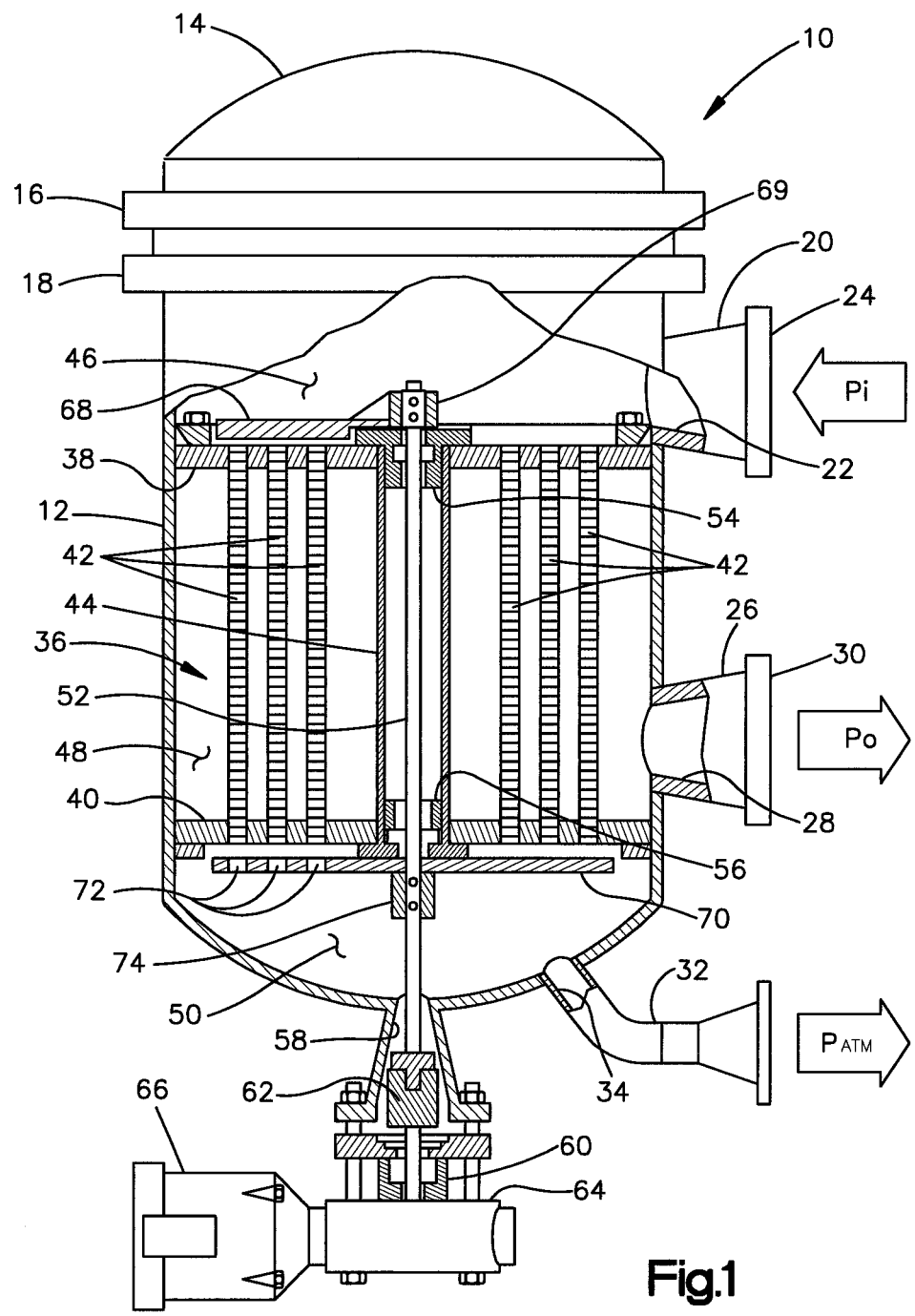
FIG. 1 is a side elevation view of the filtering system of the present disclosure with portions of the pressure vessel wall broken away to expose the interior components of one version of the system.

Referring to FIG. 1, one version of the filtering system of the present disclosure is indicated generally at 10 and includes a pressure vessel having a wall 12 with a removable lid 14 secured thereto by any suitable expedient, as for example, clamps or bolts (not shown) disposed peripherally about an annular flange 16 provided on the lid and an annular flange 18 provide on the pressure vessel. The pressure vessel has, adjacent the flange 18, an inlet fitting 20 having an inlet passage 22 communicating with the interior of the pressure vessel and an annular flange 24 provided thereon which is adapted for connection to a line (not shown) supplying a flow of fluid pressurized at an inlet pressure $P_i$. The pressure vessel has an outlet fitting 26 provided thereon located adjacent the end of the vessel remote from the inlet 20 and fitting 26 has an outlet passage 28 formed therein communicating with the interior of the vessel wall and an annular flange 30 provided thereon which is adapted for connection to a discharge line (not shown). The lower end or bottom of the pressure vessel wall has provided thereon a drain fitting 32 with a drain passage 34 communicating with the interior of the pressure vessel; and, the drain passage 34 is adapted to be open to atmospheric pressure denoted $P_{atm}$ selectively upon actuation of a remotely disposed drain valve (not shown).

A filter cartridge assembly indicated generally at 36 is disposed in the pressure vessel upon removal of the lid, and has a pair of annular spaced headers comprising an upper tube sheet 38 and a lower tube sheet 40, the tube sheets having disposed therein respectively opposite ends of a plurality of hollow permeable tubular filter media elements 42 disposed in circumferentially and radially spaced array or arrangement. The tubular filter elements 42 are disposed about a tubular core 44 which has one end thereof connected to the upper tube sheets 38 and the opposite end connected to the lower tube sheets 40 in such as manner as to close the annular space about the tube between the tube sheets.

The upper tube sheets 38 has its periphery sealed about the inner periphery of the wall 12 of the pressure vessel so as to define an inlet chamber 46 communicating with inlet passage 22 and the interior of each of the tubular filter elements 42 which have one end of each tube open through the tube sheet 38 to the inlet chamber 46. The lower tube sheet 40 has the periphery thereof contacting the inner periphery of the vessel wall 12 so as to form a closed outlet chamber 48 between the tube sheets 38, 40; and, chamber 48 isolates the exterior of the filter tubes 42 from the inlet chamber 46. The tube sheet 40 also defines the drain chamber 50 which is isolated from the outlet chamber 48 but communicates with the drain passage 34. The outlet passage 48 communicates the exterior of the filter media tubes 42 with the outlet passage 28. In normal service operation, fluid at the pressure $P_i$ enters inlet chamber 46 and flows into the interior of the filter media tubes 42 and also to the drain chamber 50 which it will be understood in normal service is closed by the unshown remote drain valve. The inlet pressure $P_i$ causes fluid to permeate the filter media tube 42, flow therethrough and enter the discharge chamber 48 and flow outwardly therefrom through outlet passage 28 at a discharge pressure $P_o$. Under normal operation 100% of inlet flow will pass through media outlet passage 28.

A shaft 52 is received through core tube 44 and an upper end thereof is journalled for rotation in a bushing or bearing 54 provided at the upper end of core tube 44; and, the opposite lower end of the shaft is journalled in a similar bushing 56 provided in the tube sheet 40. The shaft 52 extends outwardly of the pressure vessel wall through drain chamber 50 and through a port collar 58 formed in the lower end of the pressure vessel. The end of the shaft extending through port 58 is sealed for rotation therein by suitable seal 60 and is connected by a rotary coupling 62 to a speed reducer 64 driven by motor 66 which is remotely energized selectively by suitable controls (not shown).

A paddle valve member 68 is disposed closely adjacent the upper ends of tubes 42 and is connected to rotate with the upper end of shaft 52 extending through tube sheet 38. The paddle valve member 68 is connected to the upper end of the shaft 52 by hub 69. A disc valve member 70 having a plurality of arcuate slots 72 formed therein is disposed closely adjacent the tube sheet 40 and lower ends of tubes 42 and is operative to rotate with shaft 52 by a hub 74 connected to the shaft 52.

Figure 2:
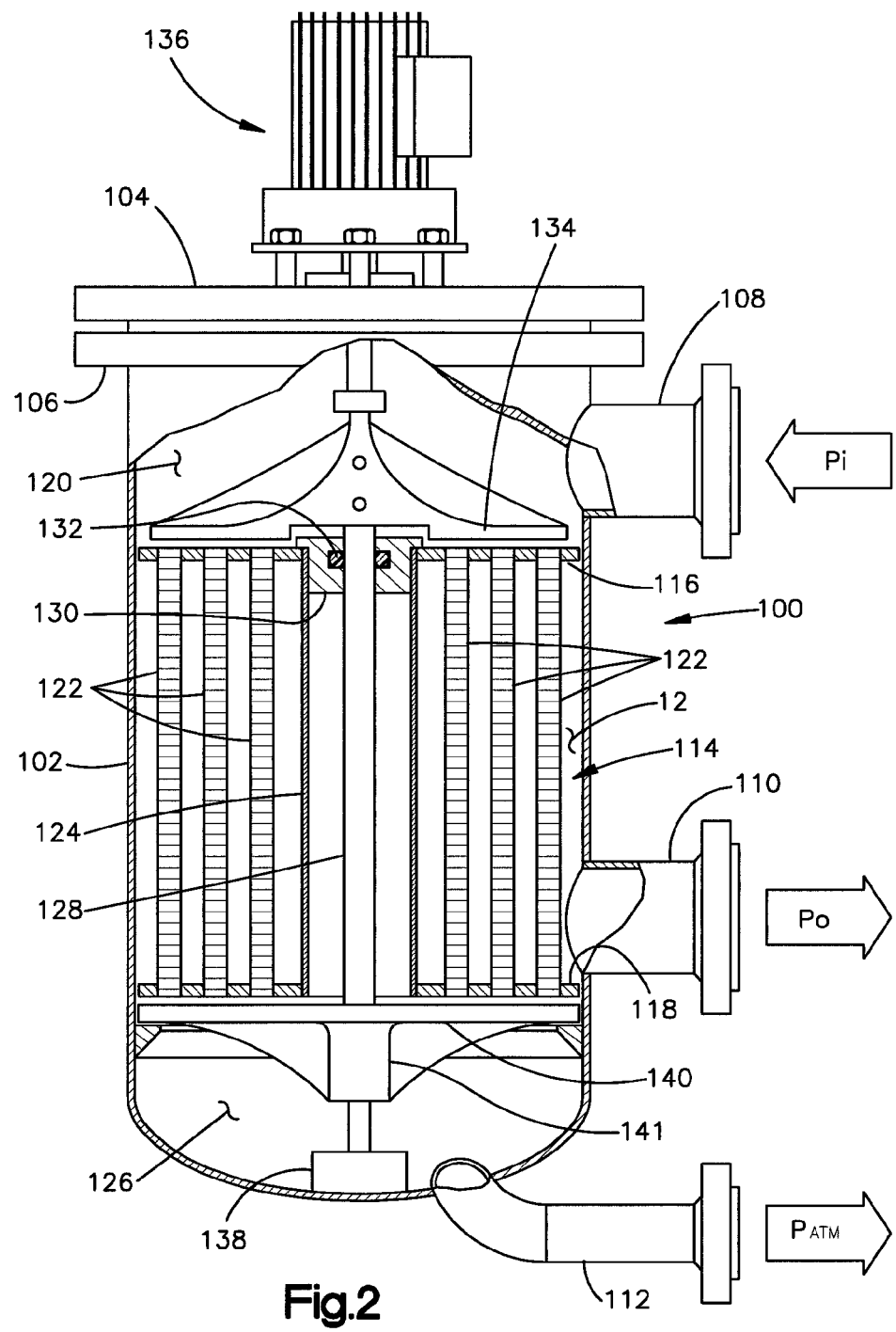
FIG. 2 is a view similar to FIG. 1 of another version of the filtering system of the present disclosure.

Referring to FIG. 2, another version of the filtering system of the present disclosure, indicated generally at 100, includes pressure vessel 102 with a lid 104 removable secured to a flange 106 provided on the pressure vessel. The pressure vessel has an inlet fitting 108 receiving pressurized fluid at an inlet pressure $P_i$ and an outlet fitting 110 discharging pressure fluid at pressure $P_o$ and a drain fitting for discharging filtrate contaminated flow to atmospheric pressure in a manner similar to the version of FIG. 1.

The system 100 has a filter cartridge assembly 114, similar to the cartridge assembly 36 of the version of FIG. 1, disposed in the pressure vessel 102. The cartridge has an upper tube sheet 116 and a lower tube sheet 118 respectively forming an inlet chamber 120, an outlet chamber 121 in a manner similar to the version of FIG. 1. Inlet chamber 120 communicates fluid pressure $P_i$ from fitting 108, to the interior of a plurality of filtering tubes 122 disposed in an array between tube sheets 116, 118 with the cartridge 114 including a core tube 124 forming the inner wall of the outlet chamber 121.

The lower tube sheet 118 of the cartridge 114 forms a drain chamber 126 in the lower end of the pressure vessel which drain chamber is isolated from the outlet chamber and communicates the interior of the filter tubes with the drain 112 when selectively opened by a remotely controlled valve (not shown) to exhaust the drain chamber 126 to the atmosphere. The drain chamber 126, in normal operation with drain 112 closed, is open to the interior of the filter tubes 122 and is thus, in service, maintained at the inlet pressure $P_i$.

A shaft 128 is received through core tube 124 and journalled in tube sheet 116 by a suitable bearing 130 provided with a rotary seal 132. The end of the shaft extending through the bushing 130 has a paddle valve 134 connected thereto and spaced closely adjacent the upper end of the tubes 122 and tube sheet 116. The shaft has its upper end thereof extending through lid 104 in a rotary sealing manner and is operatively connected to a drive unit 136 which may include a motor and speed reducer. The drive unit 136 may be releasably connected to the shaft 128 to permit ready removal of the lid 104.

The lower end of the shaft 128 is journalled for rotation in a suitable bushing or bearing 138 disposed on the inner surface of the wall of the pressure vessel forming drain chamber 126.

A rotary discharge disc valve member 140 is disposed closely adjacent the lower ends of the filter tubes 122 and tube sheet 118 in drain chamber 126 and has a hub 141 connecting the disc valve 140 to shaft 128 for rotation therewith.

Referring to FIG. 3a, the paddle valve 134 is shown, with tube sheet 116, 118 omitted for clarity, positioned with respect to one of the filter tubes 122 so as to permit fluid at inlet pressure $P_i$ to enter the interior of the tube 122 through its upper end; and, the disc valve 140 is positioned to block discharge from the interior of the tube to the drain chamber 126. In the present practice, paddle valve 134 and disc valve 140 are secured to shaft 152. Flow entering tube 122 is free to permeate the media and pass into outlet chamber 121. Solid material captured will accumulate on the interior surface of tubes 122. In this position the element tube is isolated and no flow occurs through the tube or through the media.

Referring to FIG. 3b, the paddle valve 134 has been rotated counterclockwise by an amount to cause paddle valve 134 to block the inlet of tube 122; whereas disc valve member 140 remains positioned to continue to block flow outwardly from the interior of the filter tube 122.

Referring to FIG. 3c, the shaft 152 has been rotated further counterclockwise from the position of FIG. 3b to a new position where the paddle valve member 134 remains blocking the inlet of the filter tube 122 and the disc valve member 140 is moved to a position wherein an arcuator sector slot 142, formed in the disc valve member 140, opens the interior of the filter tube 122 at its lower end to the drain chamber 126 and to atmospheric pressure through fitting 112 it being understood that the unshown drain valve is now open. The lowered pressure on the interior of the filter tube 122 thus causes a negative pressure differential across the filter tube 122 by virtue of the pressure in the interior of the tube 122 being at a substantially lower pressure than the pressure $P_o$ in the outlet chamber 114 surrounding the filter tube 122. This results in back flushing of particulate material on the interior of the tube 122 downwardly in the tube 122 into the drain chamber 126 and outward through drain fitting 112.

Referring to FIG. 3d, shaft 152 has been further rotated in a counterclockwise direction from the position of FIG. 3c to a position in which paddle valve 134 opens the upper or inlet end of filter tube 122 to inlet pressure with the slot 142 in disc valve 140 maintaining the lower end of the filter tube 122 open to the drain chamber 126 such that the interior of the tube 122 is flushed downwardly by inlet pressure $P_i$ to the drain chamber 126. Further rotation of the shaft 152 returns the disc valve member 140 to the position shown in FIG. 3a and the sequence is repeated for another circumferential adjacent set of tubes.

With reference to Table 1, the valving of the paddle valve 134 and disc valve 140 may be rotationally positioned with respect to each other to effect various combinations or modes of backflushing as described therein.

TABLE 1

| Mode | Paddle Valve | Disc Valve | Drain | Process |
|------|--------------|------------|-------|---------|
| 1 3a | Filter inlet blocked | Filter tube open | open | Traditional Back Wash |
| 2 3b | Filter inlet blocked | Filter closed then open | open | Dry cycle no flow through tube and traditional Back Wash |
| 3 3c | Filter inlet blocked and open | Filter closed and open | open | Dry cycle/Traditional Back Wash/and center flush |
| 4 3d | Filter inlet blocked and open | Filter closed and open | open | Dry cycle and center flush |
| 5 | Filter inlet open | Filter outlet open | open | Center flush |

Figure 4:
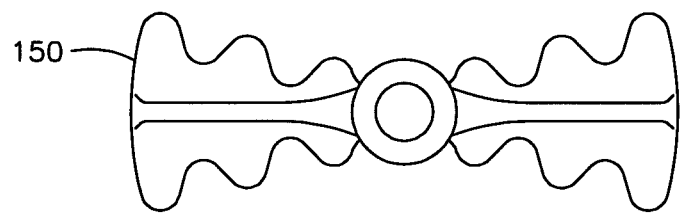
FIG. 4 is a plan view of the paddle valve employed in one version of the filtering system of the present disclosure; and, FIG. 5 is a plan view of the discharge disc valve employed with the paddle valve of FIG. 4.
Figure 5:
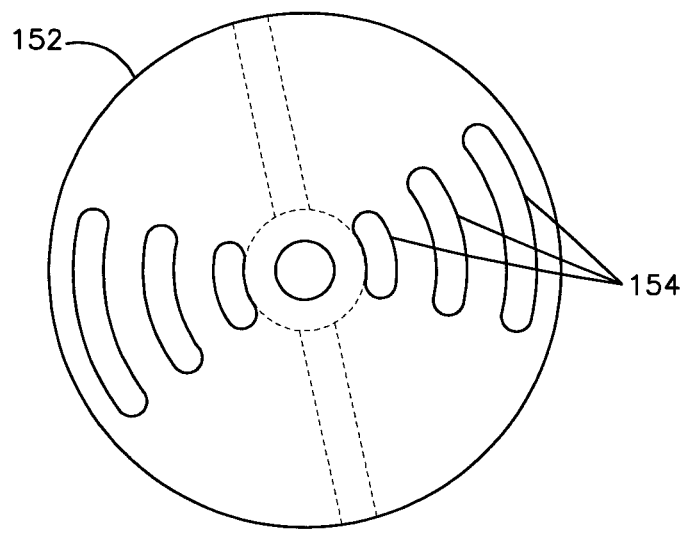

Referring to FIGS. 4 and 5, alternate forms of the paddle valve which may be employed for either paddle valve 68 or paddle valve 134 are shown in FIG. 4 and denoted by reference numeral 150. An alternate form of the disc valve 70, 140 is shown in FIG. 5 and denoted with reference numeral 152 as having a plurality of elongated arcuate slots radially spaced formed therein and denoted by reference numeral 154. Corresponding slots 72 are provided in the version of FIG. 1.

In the present practice, it has been found satisfactory to utilize about 150 to about 600 of the tubes 42, 122; and, in one version 290 tubes are employed The present disclosure thus provides a fluid pressure filtering system in which a filter cartridge is disposed in a pressure vessel with a plurality of tubes of filter material disposed between spaced headers dividing the pressure vessel into an inlet chamber, an outlet chamber and drain chamber isolated from the inlet and outlet chambers. Rotary valves disposed adjacent the inlet header and drain chamber header are operated by a central shaft through a core tube in the cartridge which shaft is connected to a motorized speed reducer upon energization of the motor. The rotary valve in the inlet chamber selectively progressively closes the inlet end of the filter tubes while the rotary valve in the drain chamber opens the interior of the tubes to drain at atmospheric pressure. The drop in fluid pressure in the drain chamber causes on the discharge pressure outlet side of the filter tubes to create a negative differential pressure across the filter tubes creating backflow through the filters which discharges trapped filter material through the end of the tube to the drain chamber. The rotary valve on the inlet side may then open the inlet of the tube to inlet pressure flushes the loosened trapped filter material through the tube to the drain chamber.

The system of the present disclosure thus enables a filter cartridge having an array of filter media tubes to be remotely selectively back flushed during service by sequentially flushing the tubes with the rotary valving element to permit removal of trapped filtered material in service without disrupting the filtering flow in the balance of the filter array.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A backwash system for a fluid filter comprising:
   (a) a fluid pressure vessel having an interior wall surface and an inlet and outlet communicating with the wall surface and adapted for connection respectively to a fluid supply and discharge line;
   (b) a removable filter cartridge having a plurality of tubular filter elements having oppositely disposed open ends disposed in an array with a pair of spaced tube sheets each disposed at one of opposite ends of the tubular filter elements with the tube sheets having a centrally disposed tube extending therebetween, wherein the cartridge is insertable in the pressure vessel;
   (c) a shaft received through the centrally disposed tube and journalled for rotation with respect thereto;
   (d) an outlet chamber formed, upon insertion of the cartridge in the pressure vessel, by sealing contact of the pair of tube sheets with the wall surface of the pressure vessel, wherein the outlet communicates exclusively with the outlet chamber and the opposite open ends of each of the tubular filter element are isolated from the outlet chamber and an outer peripheral surface of each tubular filter element intermediate the tube sheets is disposed in the outlet chamber;
   (e) an inlet chamber defined by one of the pair of tube sheets and portions of the wall surface of the pressure vessel and isolated from the outlet chamber wherein one common inlet end of each of the tubular filter elements communicates exclusively with the inlet chamber;
   (f) a drain chamber defined by the other of the pair of tube sheets and other portions of the pressure vessel interior wall and isolated from the outlet chamber, the drain chamber having a drain port provided therein wherein an opposite common open end of each of the tubular filter elements communicates exclusively with the drain chamber;
   (g) a disc-like valve member having at least one aperture therein, located for, upon rotation of the shaft, periodically blocking and opening respectively the common open end of each of the filter elements communicating with the drain chamber;
   (h) a paddle valve member disposed for rotation with the shaft in the inlet chamber and spaced closely adjacent the common inlet open end of the filter elements wherein the paddle member is configured and oriented such that upon rotation of the shaft in one direction the inlet open end of each filter element is sequentially blocked by the paddle member while the drain open end remains blocked, then subsequently the drain end of the filter element is opened at the opposite common end communicating the filter element with the drain chamber by the aperture in the disc-like member then subsequently the paddle valve opens the inlet common end communicating the filter element with the inlet chamber and the inlet fluid pressure causes fluid flow through the respective tubular filter element and flushing of filtered material to the drain; and, (i) motor means operative upon energization for rotating the shaft.

2. The system of claim 1, wherein the disc-like member includes a plurality of radially spaced arcuate slots.

3. The system of claim 1, wherein the filter elements have an inside diameter of about 0.357-1.0 inches (9.5 mm to about 25.4 mm) and a diameter of about 24 to about 36 inches (609 mm to about 914 mm).

4. The system of claim 3, wherein the annular chamber includes about 150 to about 600 filter elements.

5. The system of claim 1, wherein the motor means includes a motor and speed reducer connected to an end of the shaft extending externally of the pressure vessel.

6. The system of claim 1, wherein the pressure vessel includes a removable lid.

7. The system of claim 6, wherein the motor means is mounted on the removable lid and the shaft extends externally through the lid.

8. A backwash system for a fluid filter comprising:

(a) a fluid pressure vessel having an interior wall with an inlet, outlet and removable lid;

(b) a filter cartridge having a plurality of tubular filter elements with oppositely disposed open ends disposed in array between a pair of spaced tube sheets, the tube sheets having a core tube extending between;

(c) the cartridge being received in the pressure vessel with one of the pair of tube sheets cooperating with the interior wall surface to define an inlet chamber communicating with the inlet and with an inlet open end of each of the tubular filter elements, the other of the pair of tube sheets cooperating with the interior wall surface to define a drain chamber communicating with a drain end of each tubular filter element, the drain chamber having a drain port, wherein an outlet chamber is defined intermediate the tube sheets, the outlet chamber communicating with the outlet and isolated from the inlet chamber and drain chamber;

(d) a shaft extending through the core tube of the cartridge and journalled for rotation with respect thereto;

(e) a first rotary valve in the inlet chamber and a second rotary valve disposed in the drain chamber, the first and second rotary valve each operably connected with the shaft for rotation therewith;

(f) wherein upon rotation of the shaft in one direction, the first and second rotary valves are operable with respect to each tubular filter element in one revolution of the shaft to sequentially block the inlet open end of the tubular filter element in the inlet chamber, with the second rotary valve blocking the drain open end of the respective tubular filter element, maintain both inlet and drain open ends blocked for a specified portion of the movement of the first and second rotary valve, then subsequently the second rotary valve opens the drain end of the tubular filter element permitting filtered material trapped in the tubular filter element to flow out therefrom to the drain chamber and drain port and with subsequent rotation of the shaft the first rotary valve opens the inlet end of the tubular filter element with the second rotary valve maintaining the drain end of the tubular filter element open for inlet pressure flushing of the tubular filter element to the drain chamber.

9. The system defined in claim 8, wherein the second rotary valve sequentially opens the drain end of each of tubular filter elements before the first rotary valve blocks the inlet end of the tubular filter element.

* * * * *